US007878464B2

(12) United States Patent
Oh

(10) Patent No.: US 7,878,464 B2
(45) Date of Patent: Feb. 1, 2011

(54) MOUNTING STRUCTURE OF COUPLER FOR SPRINKLER

(75) Inventor: Seung-il Oh, Seoul (KR)

(73) Assignee: Kofulso Co., Ltd., Incheon-si (KR)

( * ) Notice: Subject to any disclaimer, the term of this patent is extended or adjusted under 35 U.S.C. 154(b) by 99 days.

(21) Appl. No.: 12/385,596

(22) Filed: Apr. 14, 2009

(65) Prior Publication Data

US 2010/0237201 A1 Sep. 23, 2010

(30) Foreign Application Priority Data

Mar. 20, 2009 (KR) ..................... 10-2009-0023790

(51) Int. Cl.
*F16L 3/08* (2006.01)

(52) U.S. Cl. ............................ 248/65; 248/73; 248/75; 169/41

(58) Field of Classification Search .................. 248/62, 248/65, 72, 73, 75, 373; 52/506.07, 715; 169/16, 17, 37, 41

See application file for complete search history.

(56) References Cited

U.S. PATENT DOCUMENTS

| | | | | | |
|---|---|---|---|---|---|
| 2,466,247 | A | * | 4/1949 | Land | 248/62 |
| 3,066,904 | A | * | 12/1962 | Cook et al. | 248/342 |
| 3,175,262 | A | * | 3/1965 | Wilson | 24/16 R |
| 3,608,847 | A | | 9/1971 | Hufford | 248/317 |
| 3,612,461 | A | | 10/1971 | Brown | 248/317 |
| 3,652,780 | A | | 3/1972 | Wilson | 248/72 |
| 3,874,035 | A | | 4/1975 | Schuplin | 248/72 |
| 4,135,692 | A | | 1/1979 | Ferguson | 248/317 |
| 4,436,266 | A | * | 3/1984 | Gerding | 248/74.1 |
| 4,717,099 | A | | 1/1988 | Hubbard | 248/57 |
| 4,723,749 | A | | 2/1988 | Carraro et al. | 248/317 |
| 5,595,363 | A | | 1/1997 | De Leebeeck | 248/72 |
| 5,615,851 | A | * | 4/1997 | LeBeau | 248/73 |
| 5,622,341 | A | * | 4/1997 | Stana | 248/74.1 |
| 5,667,181 | A | | 9/1997 | Van Leeuwen et al. | 248/343 |
| 6,123,154 | A | * | 9/2000 | MacDonald et al. | 169/37 |
| 6,138,960 | A | * | 10/2000 | Carbonare et al. | 248/62 |
| 6,260,810 | B1 | | 7/2001 | Choi | 248/65 |
| 6,345,800 | B1 | | 2/2002 | Herst et al. | 248/342 |
| 6,554,231 | B2 | | 4/2003 | Choi | 248/65 |
| 6,811,130 | B1 | | 11/2004 | Oh | 248/343 |
| 7,264,214 | B2 | * | 9/2007 | Oh | 248/342 |
| 7,427,051 | B2 | | 9/2008 | Oh | 248/73 |
| 7,506,845 | B2 | * | 3/2009 | Oh | 248/73 |
| 7,735,787 | B2 | * | 6/2010 | Kafenshtok et al. | 248/75 |
| 2002/0000498 | A1 | * | 1/2002 | Workman | 248/62 |
| 2003/0025047 | A1 | * | 2/2003 | Kilkenny | 248/65 |
| 2004/0046089 | A1 | * | 3/2004 | Kirschner | 248/75 |

* cited by examiner

*Primary Examiner*—Terrell Mckinnon
*Assistant Examiner*—Bradley H Duckworth
(74) *Attorney, Agent, or Firm*—Jacobson Holman PLLC

(57) ABSTRACT

Disclosed herein is a mounting structure of a coupler for a sprinkler. The mounting structure is constructed so that a coupler to which a sprinkler head and a water supply line are connected is fitted into a clamp in a lateral direction and is secured at a predetermined position by a snap part, and a support structure having a shape corresponding to the cross-section of the coupler is provided so as to prevent the coupler from rotating in the clamp.

4 Claims, 9 Drawing Sheets

MOUNTING STRUCTURE OF COUPLER FOR SPRINKLER

BACKGROUND OF THE INVENTION

1. Field of the Invention

The present invention relates to a mounting structure of a coupler for a sprinkler, which is intended to fit the coupler into a clamp in a lateral direction.

2. Description of the Related Art

Generally, a stock bar is coupled to T-bars by being placed crosswise between them. After a clamp is mounted to the stock bar, a coupler to which a sprinkler head is coupled is secured to the stock bar using the clamp.

FIG. 1 is a view illustrating a conventional mounting structure of a coupler for a sprinkler. As shown in the drawing, the mounting structure includes T-bars 1, a stock bar 2, a clamp 3, and a snap part 4. Each T-bar 1 has on its upper portion a locking part 1*a*. The stock bar 2 has on both ends thereof mounting parts 2*a* which are mounted to the corresponding T-bars 1. Fitting holes 3*b* are formed in both sidewalls 3*a* of the clamp 3 and fitted over the stock bar 2 in such a way that the clamp 3 moves horizontally. A bent part 3*c* is provided on one end of the clamp 3 in such a way as to be in close contact with the coupler 5, whereas an opening 3*d* is provided in the other end of the clamp 3. The snap part 4 is rotatably installed in the opening 3*d* of the clamp 3 so as to secure the coupler 5 at a predetermined position.

When the snap part 4 is rotated, a compressing part 4*a* compresses the stock bar 2, so that the clamp 3 is pulled and thus the bent part 3*c* comes into close contact with the coupler 5.

However, the conventional mounting structure of the coupler for the sprinkler is problematic in that the snap part 4 must be rotated while the coupler 5 is moved from an upper position to a lower position to be vertically fitted into the clamp 3 and thereafter is held by a worker, so that the installation thereof is complicated.

Further, since the clamp 3 is manufactured by bending a plate of a predetermined thickness, the bent part 3*c* and the sidewalls 3*a* are not evenly in contact with the flat surfaces 5*a* of the coupler 5. Thus, if a large tightening force is applied to fasten a head 6 to the coupler 5 in a threaded manner, the coupler 5 may undesirably rotate inside the bent part 3*c*.

The conventional mounting structure is unstable and thus during quality inspections it is deemed defective. In order to overcome the problems, a mounting structure according to the present invention is proposed by the inventor of the present invention.

SUMMARY OF THE INVENTION

Accordingly, the present invention has been made keeping in mind the above problems occurring in the prior art, and an object of the present invention is to provide a mounting structure of a coupler for a sprinkler, which is constructed so that a coupler to which a sprinkler head and a water supply line are connected is fitted into a clamp in a lateral direction and is secured at a predetermined position by a snap part, and a support structure having a shape corresponding to the cross-section of the coupler is provided so as to prevent the coupler from rotating in the clamp.

In order to accomplish the above object, the present invention provides a mounting structure of a coupler for a sprinkler, including a coupler, a clamp, a support plate, a rotary part and a snap part. The coupler has flat surfaces, extrapolated lines of the flat surfaces forming a polygon. The clamp includes a first cavity which is provided in the first end of the clamp in such a way as to be open to the top, an opening which is provided in the second end of the clamp, a second cavity which is provided in each of sidewalls of the clamp which are adjacent to the opening in such a way as to be open to the top, a through hole which is provided at a position on each of the sidewalls so that a stock bar is fitted into the through hole, and a hinge part protruding outwards from the second cavity. The support plate is provided integrally on each of upper and lower ends of the sidewalls, and has a fitting hole which is open towards the opening and is formed to correspond to the flat surfaces. The rotary part is rotatably connected at an end thereof to the hinge part, and opens or closes the opening. The snap part includes a holding part which is rotatably connected at both ends thereof to the sidewalls of the clamp, so that a position of the holding part is limited by the first cavity, and a compressing part which is formed by bending an end of the holding part and pushes the stock bar towards the opening.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, the preferred embodiments of the present invention will be described in detail with reference to the accompanying drawings.

Figure 1:
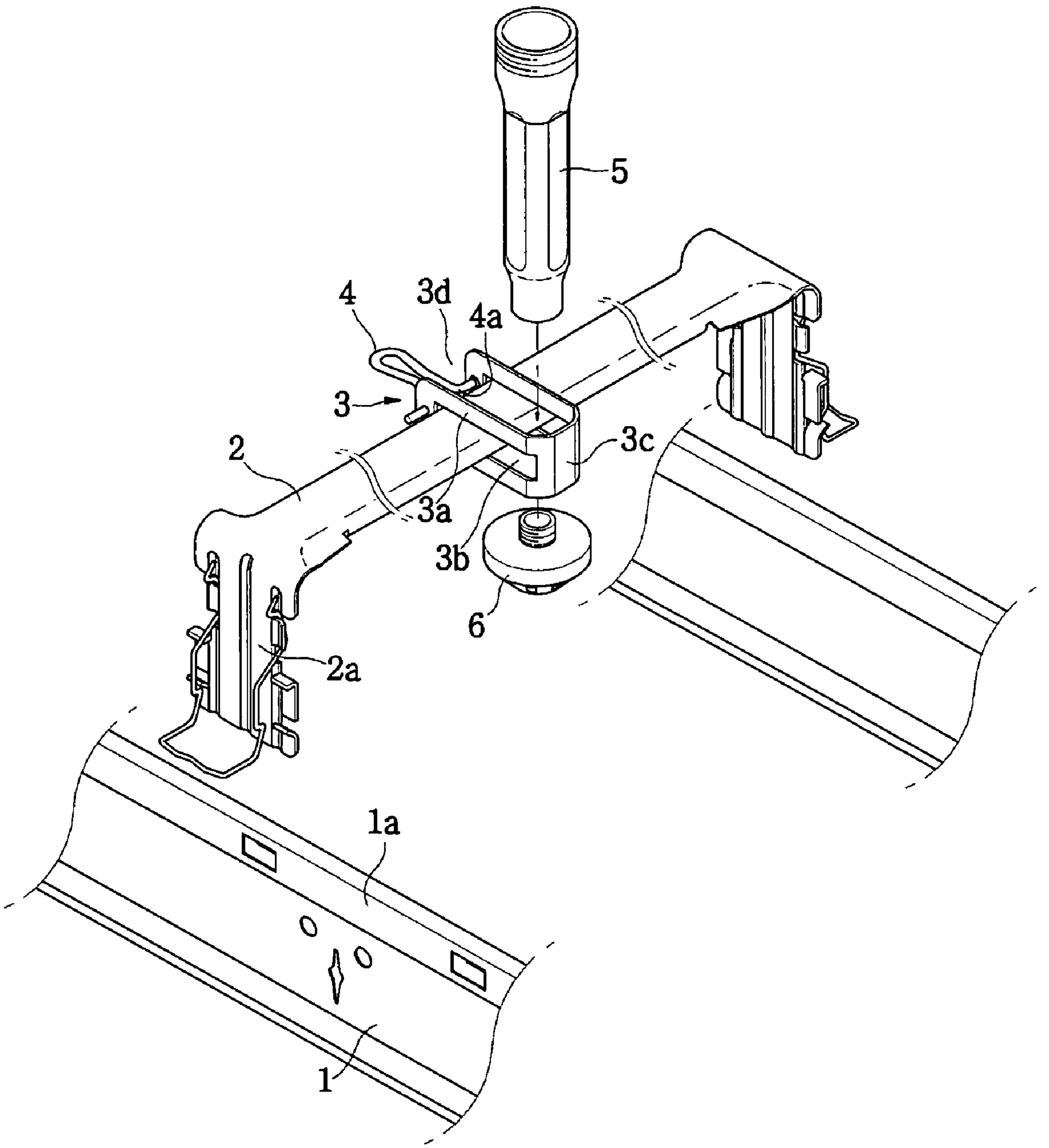
FIG 1 PRIOR ART
FIG. 1 is a perspective view illustrating a conventional mounting structure of a coupler for a sprinkler.
Figure 2:
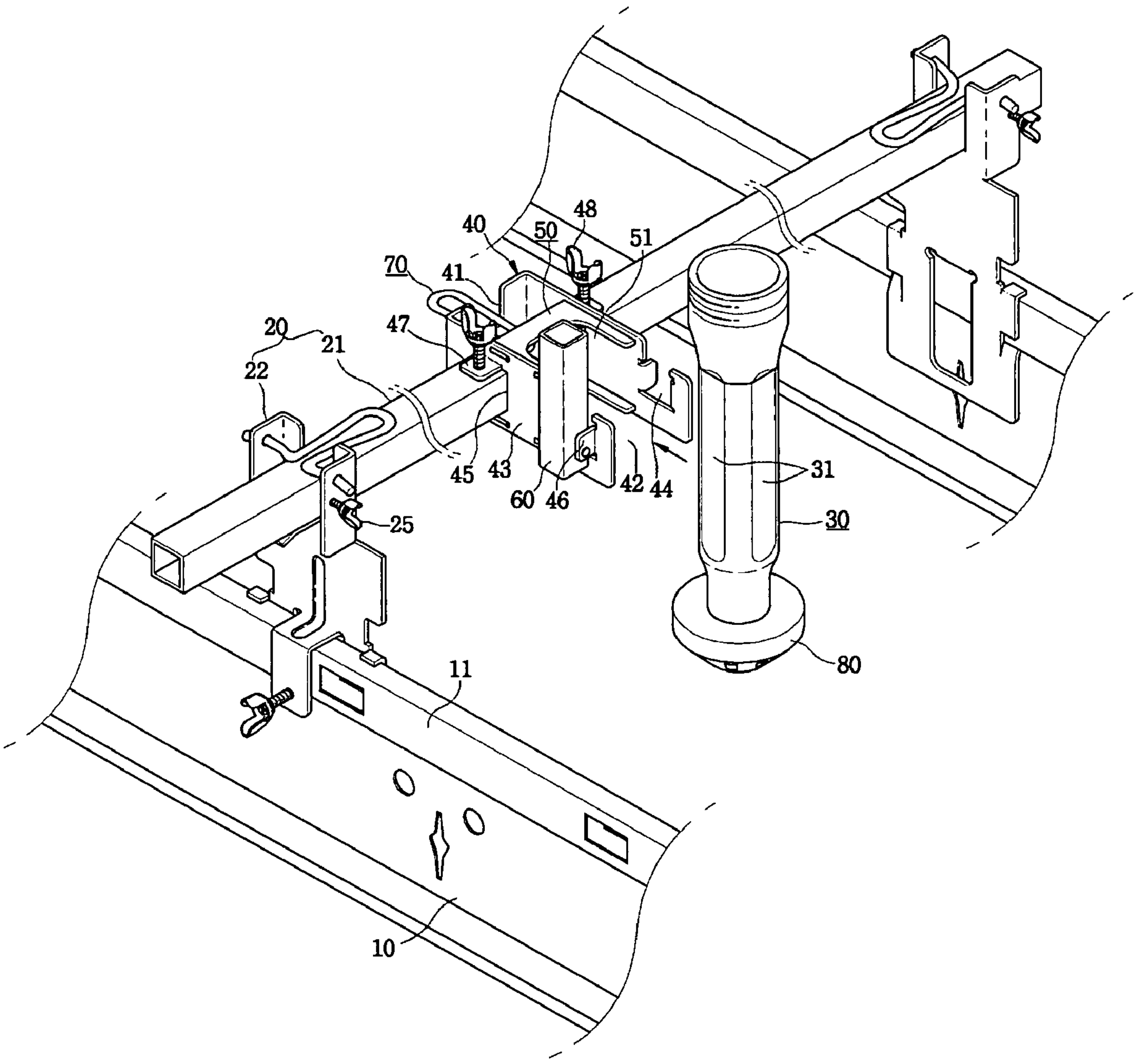
FIG. 2 is a perspective view illustrating a mounting structure of a coupler for a sprinkler according to an embodiment of the present invention.

As shown in FIG. 2, a mounting structure of a coupler for a sprinkler according to the present invention includes T-bars 10, a stock bar 20 and a clamp 40. Each T-bar 10 is a structure installed in a ceiling. The stock bar 20 is coupled to the T-bars 10 in such a way as to be placed crosswise between the T-bars 10. The clamp 40 functions to secure the coupler 30 to the stock bar 20.

Each T-bar 10 has a cross-section like an inverted 'T', and a locking part 11 is provided on the upper portion of the T-bar 10.

Figure 7:
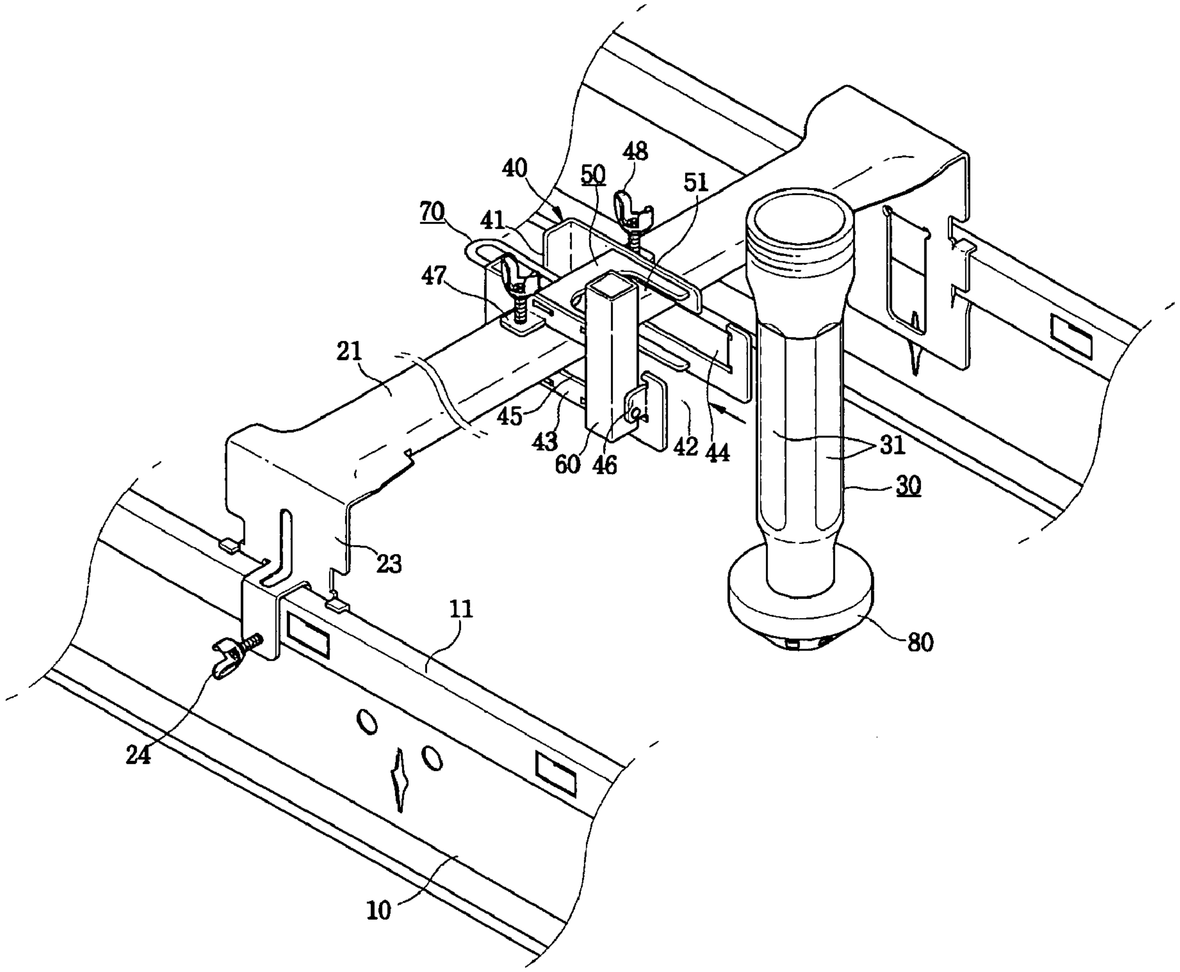
FIG. 7 is a perspective view illustrating the use of a mounting structure of a coupler for a sprinkler according to another embodiment of the present invention.

A separate-type stock bar or an integral-type stock bar is widely used as the stock bar 20. The separate-type stock bar of FIG. 2 includes a cross beam 21 which is coupled to the T-bars 10 in such a way as to be placed crosswise between the T-bars 10, and fastening parts 22 which fasten both sides of the cross beam 21 to the T-bars 10. The integral-type stock bar of FIG. 7 is constructed so that bent parts 23 having fastening means 24 are integrally provided on both ends of the cross beam 21.

In the separate-type stock bar 20, a screw 25 may be fastened to a side of each fastening part 22 to laterally push the cross beam 21 in one direction.

Figure 5:
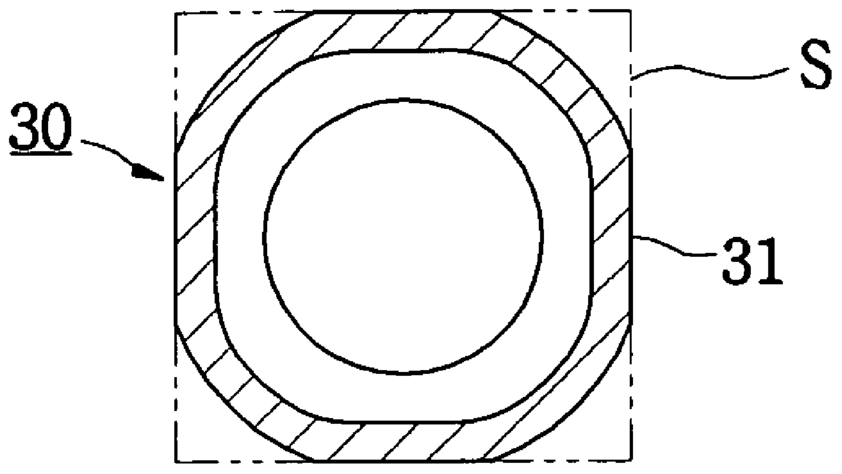
FIG. 5 is a sectional view illustrating a coupler of the present invention.

As shown in FIG. 5, the coupler 30 is manufactured such that lines S extrapolated from the flat surfaces 31 of the coupler 30 form a polygon. In the state where the coupler 30 is installed to the stock bar 20, a sprinkler head 80 is coupled to the lower end of the coupler 30.

A first cavity 41 which is open on the top side is formed in one end of the clamp 40, and an opening 42 is formed in the other end of the clamp 40. Second cavities 44 which are open on the top side are formed in the sidewalls 43 of the clamp 40 which are adjacent to the opening 42. A through hole 45 is formed in a predetermined portion of each sidewall 43 in such a way that the stock bar 20 is fitted into the through hole 45. A hinge part 46 is provided on the edge of the associated second cavity 44 in such a way as to protrude outwards therefrom.

A wing 47 is provided on the upper edge of each through hole 45, and a screw 48 may be provided on the wing 47 to push the stock bar 20 and secure it.

Figure 3:
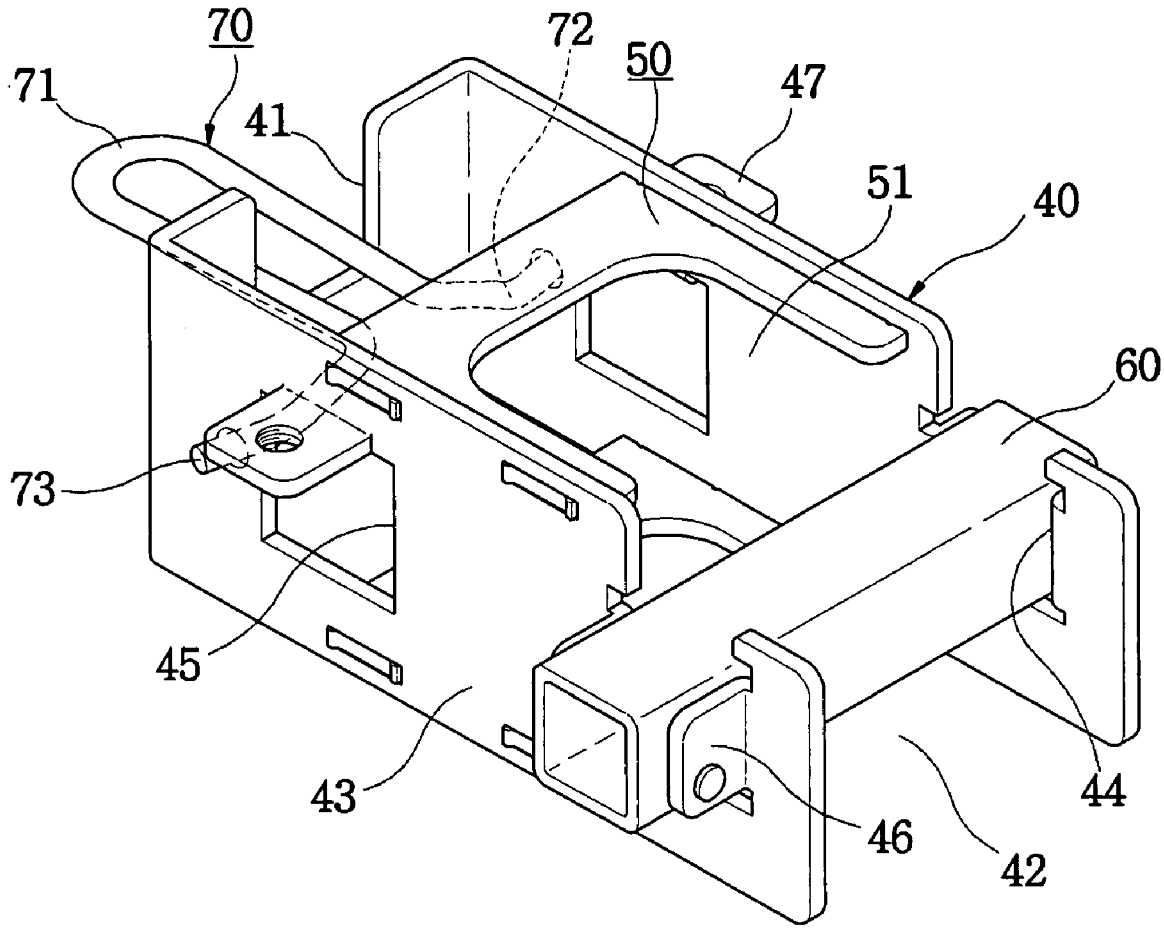
FIG. 3 is a perspective view illustrating a snap clamp according to the present invention.
Figure 4:
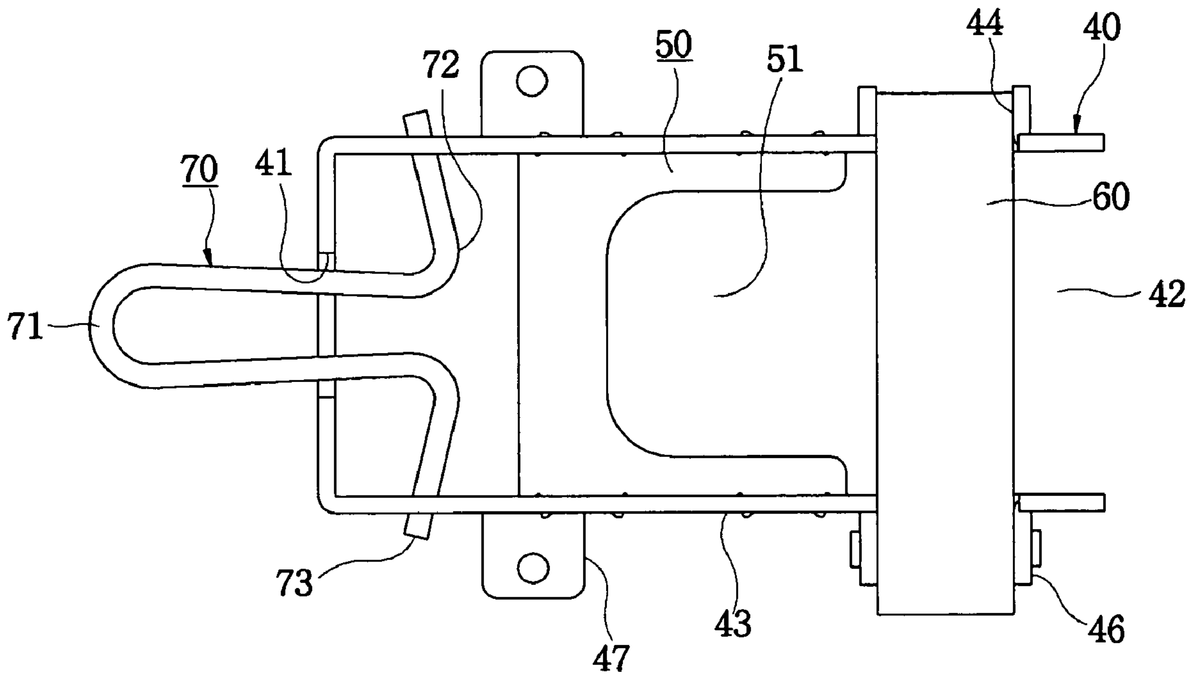
FIG. 4 is a plan view illustrating the snap clamp according to the present invention.

As shown in FIGS. 3 and 4, support plates 50 are integrally mounted to the upper and lower ends of the clamp 40. A fitting hole 51 which is open towards the opening 42 is formed in each support plate **5*b* to correspond to the flat surfaces 31**.

A rotary part 60 is mounted to the hinge part 46 to open or close the opening 42, and comprises a rectangular pipe.

Further, a snap part 70 is provided on the closed end of the clamp 40 in such a way that both ends 73 of the snap part 70 are rotatably coupled to the sidewalls 43. The snap part 70 includes a holding part 71 and compressing parts 72. The position of the holding part 71 is limited by the first cavity 41. The snap part 70 is bent at both ends thereof, thus providing the compressing parts 72 which push the stock bar 20 towards the opening 42.

In the mounting structure of the present invention constructed as described above, the coupler for the sprinkler is installed in the following order.

Figure 6A:
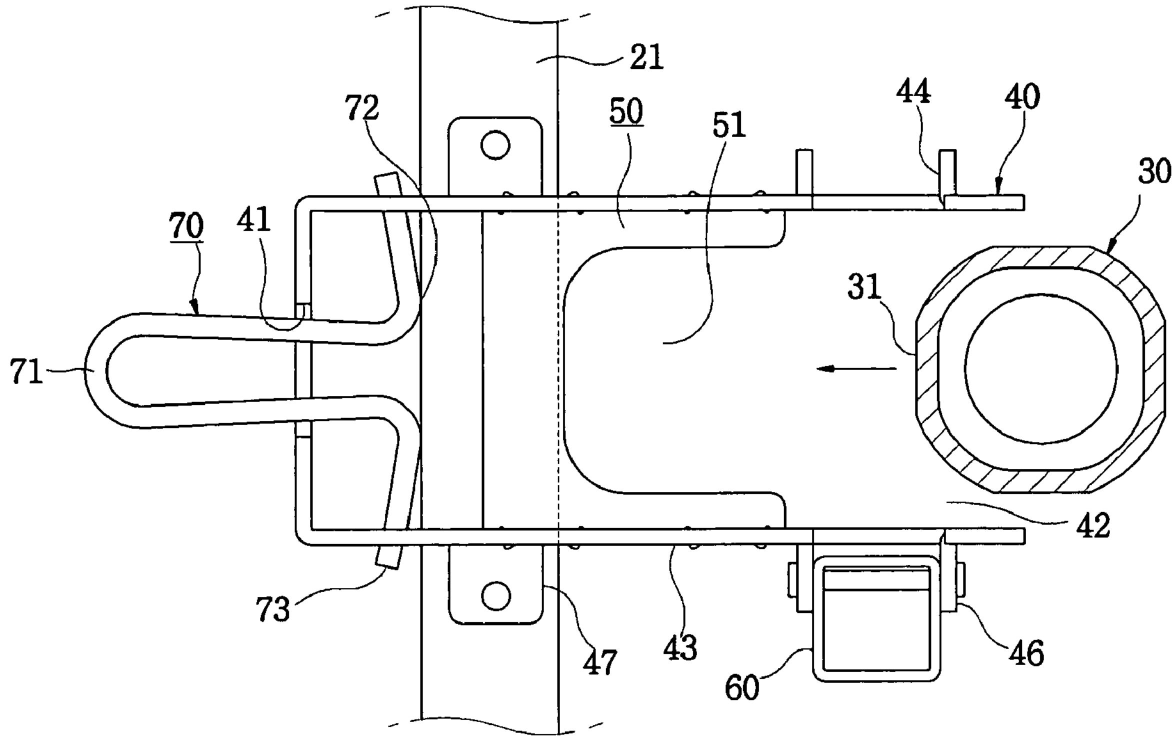
FIGS. 6A to 6C are plan views illustrating the process of installing the coupler according to the present invention.

The stock bar 20 fitted into the through holes 45 is fastened to the T-bars 10 via the fastening parts 22 in such a way as to be placed crosswise between the T-bars 10. As shown in FIG. 6A, the coupler 30 is laterally pushed through the opening 42 into the fitting hole 51. At this time, the rotary part 60 rotates around the hinge part 46, so that the opening 42 is open. The holding part 71 of the snap part 70 is fitted into the first cavity 41 and is placed down. In this state, the compressing parts 72 do not compress the stock bar 20.

Figure 6B:
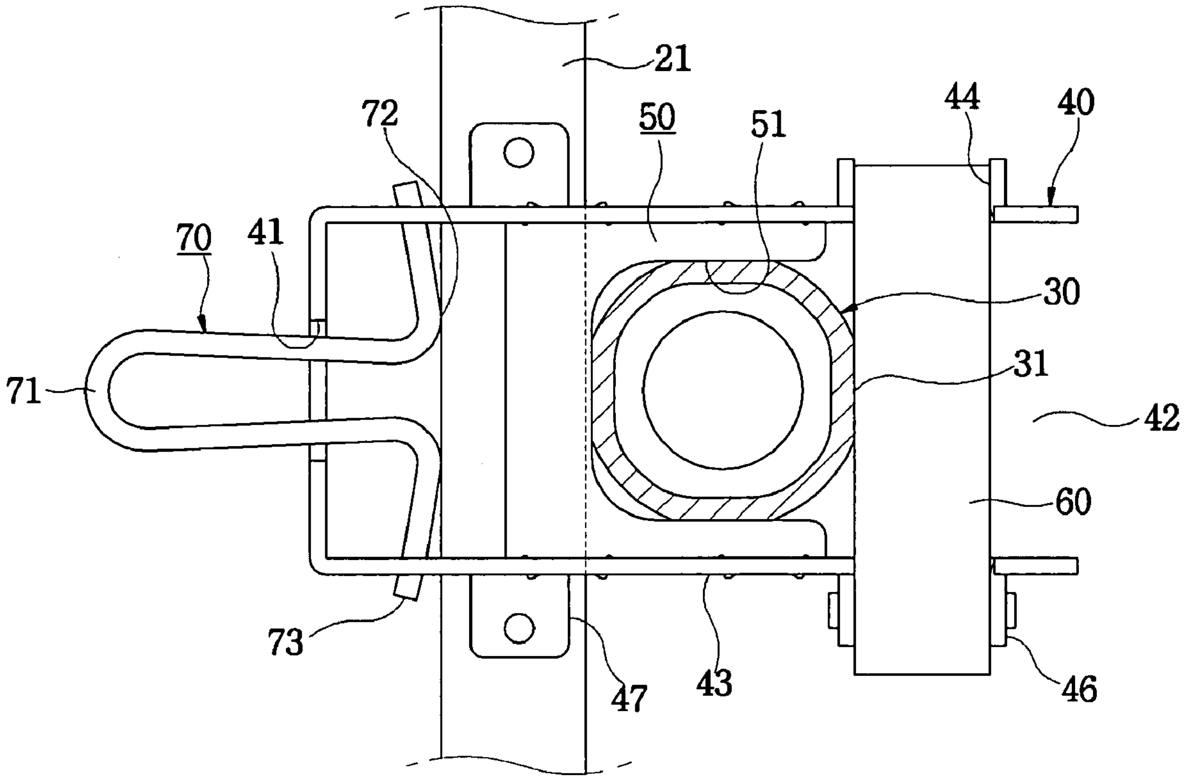

After the coupler 30 is pushed into the fitting hole 51, the rotary part 60 mounted to the hinge part 46 is rotated down to close the opening 42. Thereby, the flat surfaces 31 of the coupler 30 come into close contact with the fitting hole 51 and the rotary part 60, so that the rotation of the coupler 30 is impossible (see FIG. 6B).

Figure 6C:
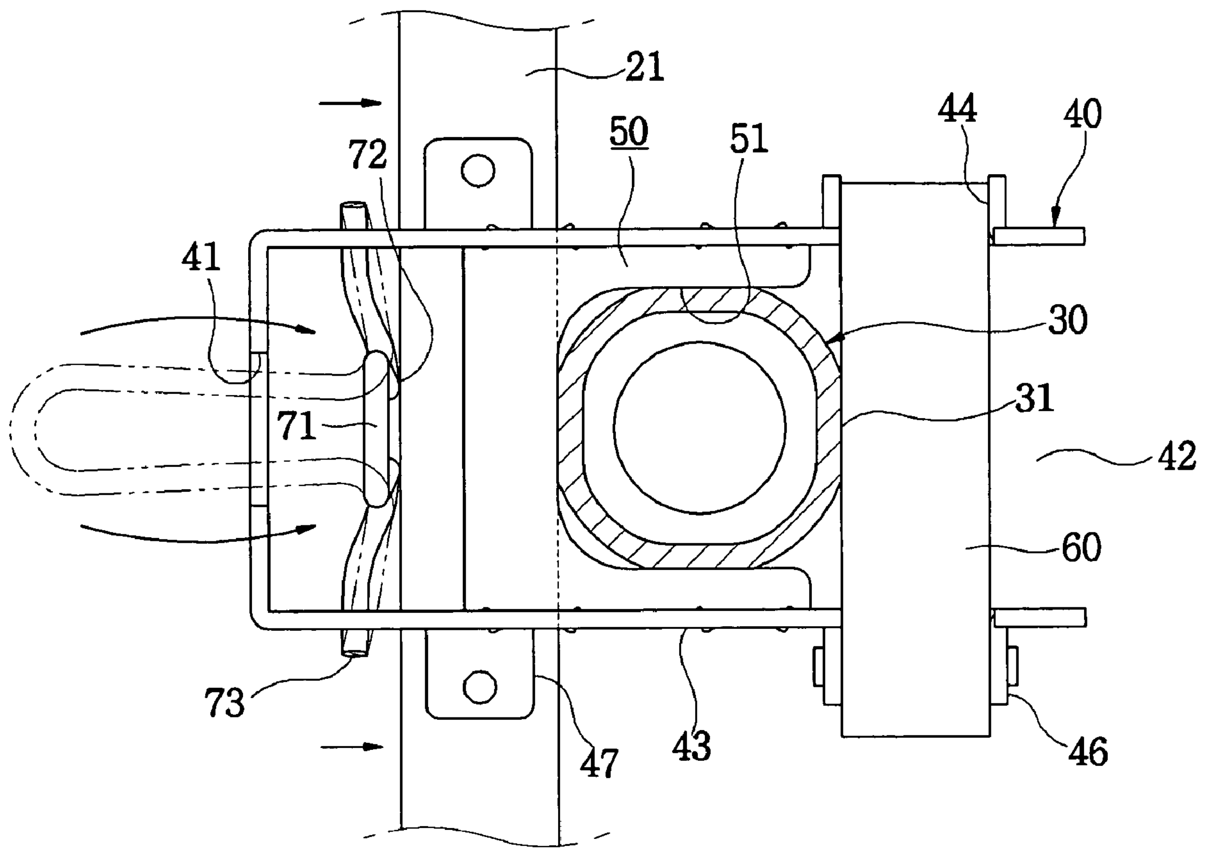

In this state, when the holding part 71 of the snap part 70 is lifted up, as shown in FIG. 6C, the compressing parts 72 push the stock bar 20, so that the clamp 40 is pulled and thus the coupler 30 comes into close contact with the stock bar 20.

Thereafter, the sprinkler head 80 and a water supply line are connected to the coupler 30 installed in the clamp 40, so that the sprinkler installing work has been completed.

FIG. 7 is a view illustrating the embodiment having a stock bar which is constructed so that the bent parts each having a fastening means are integrated with a cross beam into a single structure. Such a construction makes the through holes 45 communicate with the fitting hole 51, thus allowing the wide cross beam 21 of the integral-type stock bar to be fitted into the through holes 45.

According to this embodiment, the flat surfaces 31 of the coupler 30 are in close contact with the fitting hole 51 and the rotary part 60, thus preventing the coupler 30 from being rotated in the clamp 40 by external force. Further, the coupler 30 is pushed laterally through the opening 42 into the clamp 40, so that installation is convenient.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A mounting structure of a coupler for a sprinkler, comprising:

- a coupler having flat surfaces, extrapolated lines of the flat surfaces forming a polygon;
- a clamp, comprising:
  - a first cavity provided in a first end of the clamp in such a way as to be open to the top;
  - an opening provided in a second end of the clamp;
  - a second cavity provided in each of sidewalls of the clamp which are adjacent to the opening in such a way as to be open to the top;
  - a through hole provided at a position on each of the sidewalls so that a stock bar is fitted into the through hole; and
  - a hinge part protruding outwards from the second cavity;
- a support plate provided integrally on each of upper and lower ends of the sidewalls, and having a fitting hole which is open towards the opening and is formed to correspond to the flat surfaces; and
- a rotary part rotatably connected at an end thereof to the hinge part, and opening or closing the opening; and
- a snap part, comprising:
  - a holding part rotatably connected at both ends thereof to the sidewalls of the clamp, so that a position of the holding part is limited by the first cavity; and
  - a compressing part formed by bending an end of the holding part, and pushing the stock bar towards the opening.

2. The mounting structure as set forth in claim 1, wherein the rotary part is a rectangular pipe.

3. The mounting structure as set forth in claim 1, wherein the through hole communicates with the fitting hole.

4. The mounting structure as set forth in claim 1, wherein a wing is provided on an upper edge of the through hole, a screw being fastened to the wing.

* * * * *